US009418490B2

(12) United States Patent
Gray et al.

(10) Patent No.: US 9,418,490 B2
(45) Date of Patent: Aug. 16, 2016

(54) DATA DISPLAY WITH CONTINUOUS BUFFER

(75) Inventors: Kevin Gray, Kalamazoo, MI (US); Harry Gilbert, Portage, MI (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 144 days.

(21) Appl. No.: 13/606,735

(22) Filed: Sep. 7, 2012

(65) Prior Publication Data

US 2014/0075362 A1 Mar. 13, 2014

(51) Int. Cl.

*G06F 3/048* (2013.01)
*G07C 5/08* (2006.01)

(52) U.S. Cl.

CPC .......... *G07C 5/0808* (2013.01); *G07C 2205/02* (2013.01)

(58) Field of Classification Search

CPC . G06F 3/0485; G06F 3/04855; G07C 5/0808; G07C 2205/02
USPC .......................................... 715/772, 814, 833
See application file for complete search history.

(56) References Cited

U.S. PATENT DOCUMENTS 4,757,463 A 7/1988 Ballou et al.
5,623,588 A * 4/1997 Gould .......................... 715/787
6,181,992 B1 1/2001 Gurne et al.
6,229,536 B1 5/2001 Alexander et al.
6,339,437 B1 * 1/2002 Nielsen ......................... 715/787
6,941,203 B2 9/2005 Chen
7,006,651 B2 2/2006 Ueki
7,555,376 B2 6/2009 Beronja
7,734,390 B2 6/2010 Chen
7,809,482 B2 * 10/2010 Bertosa et al. ............... 701/31.4
7,962,271 B1 * 6/2011 Thompson et al. ............ 701/99
7,970,722 B1 6/2011 Owen et al.
7,996,128 B2 8/2011 Bertosa et al.
8,315,760 B2 11/2012 Costantino
8,370,018 B2 2/2013 Andreasen et al.
2002/0007237 A1 1/2002 Phung et al.
2002/0077779 A1 * 6/2002 Liebl et al. .................... 702/183
2002/0154173 A1 * 10/2002 Etgen et al. ................... 345/833
2003/0060953 A1 3/2003 Chen
2004/0205534 A1 10/2004 Koelle (Continued)

FOREIGN PATENT DOCUMENTS

CA 2 506 472 A1 11/2006
EP 1953617 A2 8/2008
KR 1020030051239 A 6/2003

OTHER PUBLICATIONS

"Touch Screen" FOLDOC, Archived Jun. 10, 2010. Web. Mar. 27, 2014. http://foldoc.org/touch+screen.*

(Continued)

*Primary Examiner* — Jennifer To
*Assistant Examiner* — John Repsher, III
(74) *Attorney, Agent, or Firm* — Baker Hostetler LLP

(57) ABSTRACT

A graphical user interface that is capable of being used on a computing device, such as a vehicle diagnostic tool. The graphical user interface includes various buttons that when actuated causes the vehicle diagnostic tool to perform a corresponding functionality such as read diagnostic trouble codes and collect and display a data stream of diagnostic data of a vehicle. The graphical user interface also displays buffered data in a data window and the data may be moved using various input buttons.

18 Claims, 12 Drawing Sheets

(56) References Cited

U.S. PATENT DOCUMENTS

| | | | | |
|---|---|---|---|---|
| 2005/0033466 | A1* | 2/2005 | Eryurek et al. | 700/108 |
| 2005/0065678 | A1 | 3/2005 | Smith et al. | |
| 2005/0268237 | A1* | 12/2005 | Crane et al. | 715/732 |
| 2006/0047617 | A1 | 3/2006 | Bacioiu et al. | |
| 2006/0150122 | A1* | 7/2006 | Hintermeister et al. | 715/833 |
| 2006/0178791 | A1 | 8/2006 | Fountain et al. | |
| 2007/0050105 | A1 | 3/2007 | Chinnadurai et al. | |
| 2007/0088465 | A1 | 4/2007 | Heffington | |
| 2007/0156311 | A1 | 7/2007 | Elcock et al. | |
| 2008/0065289 | A1 | 3/2008 | Bertosa et al. | |
| 2008/0140281 | A1 | 6/2008 | Morris et al. | |
| 2008/0147267 | A1* | 6/2008 | Plante et al. | 701/35 |
| 2008/0270075 | A1 | 10/2008 | Bertosa et al. | |
| 2009/0271062 | A1 | 10/2009 | Grenn | |
| 2009/0276115 | A1 | 11/2009 | Chen | |
| 2009/0300548 | A1 | 12/2009 | Sullivan et al. | |
| 2009/0305732 | A1 | 12/2009 | Marcellino et al. | |
| 2010/0106359 | A1 | 4/2010 | Underdal et al. | |
| 2010/0127847 | A1 | 5/2010 | Evans et al. | |
| 2010/0179717 | A1* | 7/2010 | Gilbert | 701/29 |
| 2010/0205450 | A1 | 8/2010 | Sarnacke et al. | |
| 2010/0220113 | A1 | 9/2010 | Kennedy | |
| 2010/0256861 | A1 | 10/2010 | Hodges | |
| 2010/0256864 | A1 | 10/2010 | Ying | |
| 2010/0293081 | A1 | 11/2010 | Liu et al. | |
| 2011/0015823 | A1* | 1/2011 | Bertosa et al. | 701/33 |
| 2011/0055763 | A1 | 3/2011 | Utsuki et al. | |
| 2011/0141921 | A1 | 6/2011 | Reese et al. | |
| 2011/0276219 | A1 | 11/2011 | Swaminathan et al. | |
| 2011/0288954 | A1 | 11/2011 | Bertosa et al. | |
| 2012/0044086 | A1 | 2/2012 | Ruther et al. | |
| 2012/0249746 | A1* | 10/2012 | Cornog et al. | 348/47 |
| 2012/0313771 | A1 | 12/2012 | Wittliff, III | |
| 2012/0324075 | A1 | 12/2012 | Bertosa et al. | |
| 2013/0014051 | A1* | 1/2013 | Lefor et al. | 715/787 |
| 2013/0041553 | A1 | 2/2013 | Bertosa et al. | |
| 2014/0047371 | A1* | 2/2014 | Palmer et al. | 715/771 |

OTHER PUBLICATIONS

Search Report for European Patent Application No. 11160597.8, dated Aug. 5, 2011.

Search report dated Dec. 3, 2013 for PCT/US2013/057920 filed Sep. 4, 2013.

International Search Report dated Aug. 7, 2014 for PCT/US2014/030351; filed Mar. 17, 2014.

Supplementary European search report and the European search opinion dated Mar. 17, 2015.

U.S. Office Action dated Jun. 25, 2015, in U.S. Appl. No. 13/606,755.

International Search Report mailed Nov. 14, 2014 for PCT/US2014/048842 filed Jul. 30, 2014.

* cited by examiner

DATA DISPLAY WITH CONTINUOUS BUFFER

FIELD OF THE INVENTION

The invention relates generally to a vehicle diagnostic tool having a diagnostic hub and continuous data buffer. Particularly, the diagnostic hub is a graphical user interface that allows a user to navigate through the various functions of the diagnostic tool. The data buffer allows data to be automatically recorded in a memory buffer.

BACKGROUND OF THE INVENTION

Onboard control computers (electronic control units) have become prevalent in motor vehicles. Successive generations of onboard control computers have acquired increasing data sensing and retention capability as the electronics have advanced.

Vehicle diagnostic tools report the data acquired by the onboard control computers. Diagnostic tools can detect faults based on Diagnostic Trouble Codes or DTCs that are set in the vehicle's onboard control computers. A DTC can be triggered and stored when there is a problem with the vehicle. A technician then retrieves the DTCs using a diagnostic tool, repairs the associated problem and then deletes the DTCs from the vehicle's computer.

The menus on the diagnostic tools can be burdensome and require a lot of navigation to return to a central location so that additional functions can be performed by the diagnostic tool. Thus, there is a need for a diagnostic hub in the form of a graphical user interface (GUI) that provides easier navigations for the user.

SUMMARY OF THE INVENTION

The foregoing needs are met, to a great extent, by the present invention, wherein in one aspect an apparatus is provided that in some embodiments include a diagnostic tool having a diagnostic hub that can assist a user through the various functionality of the tool.

In accordance with one embodiment of the present invention, a graphical user interface for a vehicle diagnostic tool having a plurality of diagnostic functionality is provided and can include a data stream window that displays diagnostic data received from a vehicle, a zoom window that displays a zoomed part of the data stream window, a time line having increments of time, and a frame indicator that translates along the time line to indicate the increments of time being viewed on the data stream window, wherein the frame indicator is capable of being moved along the time line by a user.

In accordance with another embodiment of the present invention, a non-transitory computer-readable medium storing processor executable instructions that include a graphical user interface on a computing device having a plurality of diagnostic functionality is provided, and can include a data stream window that displays diagnostic data received from a vehicle, a zoom window that displays a zoomed portion of the data stream window, a time line having increments of time, and a frame indicator that translates along the time line to indicate the increments of time being viewed on the data stream window, wherein the frame indicator is capable of being moved along the time line by a user.

In accordance with yet another embodiment of the present invention, a computer program product comprising a non-transitory computer readable medium encoded with program instructions that, when executed by a processor in a vehicle diagnostic tool having a touch screen display, cause the processor to execute a method is provided, and can include the following: displaying on the display a recorded data stream window that contains vehicle diagnostic data, the data stream window corresponds to a time line of a recording time of the data stream window, zooming in a portion of the data stream window with a zoom window controlled by a processor of the vehicle diagnostic tool, and controlling the display of the data stream window corresponding to the time line by moving a frame indicator that translates along the time line.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
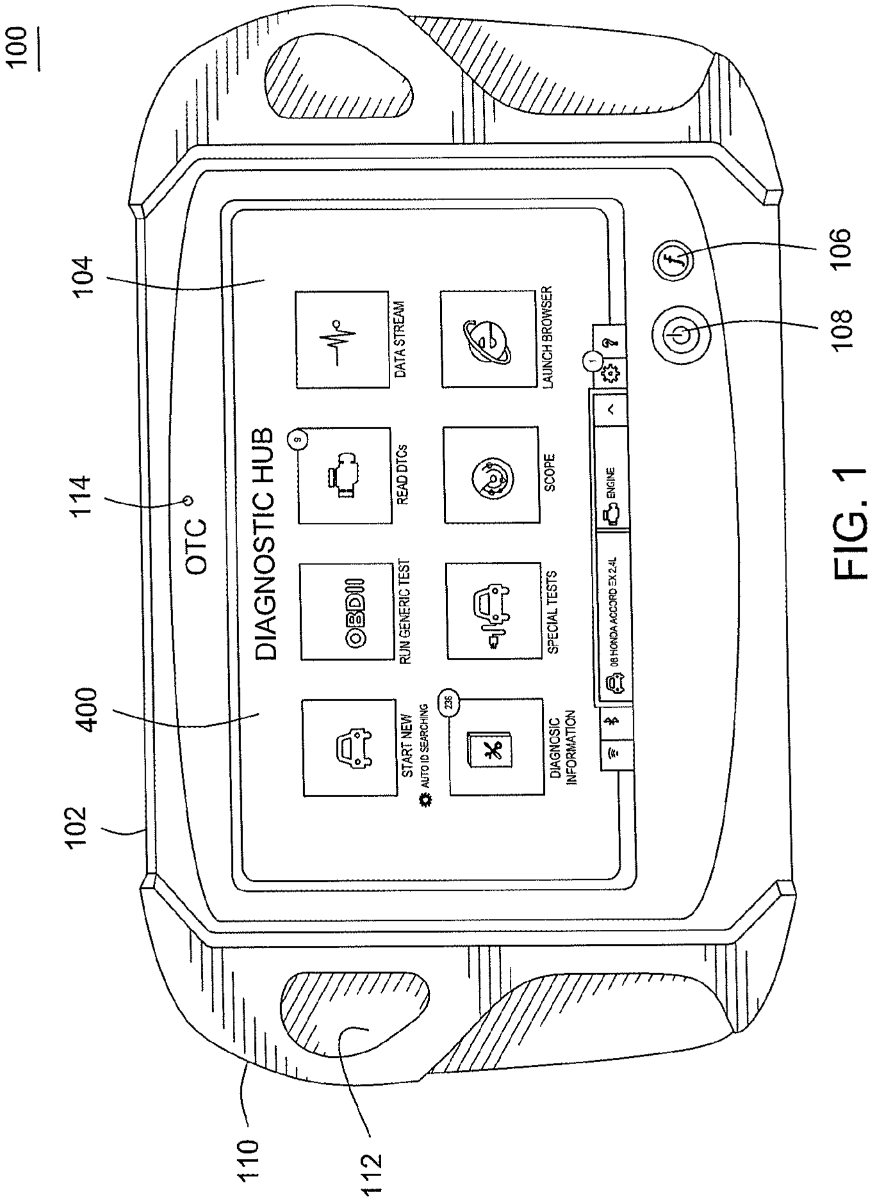
FIG. 1 illustrates a front view of a diagnostic tool according to an embodiment of the invention.

The invention will now be described with reference to the drawing figures, in which like reference numerals refer to like parts throughout. An embodiment in accordance with the present invention provides a diagnostic tool that includes a touch screen display and a diagnostic hub in the form of a GUI (Graphical User Interface). The diagnostic hub allows the user to utilize the various functionality of the diagnostic tool such as read DTCs, view and record data stream, obtain diagnostic information, run special tests, run OBD generic tests, emissions tests, search the internet or obtain additional diagnostic information and the like.

FIG. 1 illustrates a front view of a diagnostic tool 100 according to an embodiment of the invention. An example of the diagnostic tool is the Genisys® Touch from Service Solutions U.S. LLC (Owatonna, Minn.). The diagnostic tool 100 may include a housing 102, a display 104, a function button 106, a power button 108, gripping portions 110 having a finger (thumb) receiving portion 112 and a camera 114. The power button 108 can also be used to put the diagnostic tool 100 into a standby mode in order to save battery power when not in use.

The gripping portions 110 may be made of a polymer including hydrogels for easy gripping. The finger receiving portion 112 may be configured to receive a finger, such as a thumb of the user, to assist in better gripping of the diagnostic tool. The function button 106 may be configured for any function desired by the user including enter, back, forward, left, right, up, down, transmit, receive, return, start over, and the like. The function can also include multiple functions of any combination of functions, such as enter and then back, etc.

The display can be any type of display including a touch screen display, LCD, LED, VGA, OLED, SVGA and other types of displays. The display may be a colored, non-colored (e.g. gray scale) or a combination of both. The display can display information such as the make, model, year of vehicle that the diagnostic tool can diagnose, the various diagnostic tests the diagnostic tool can run, diagnostic data the diagnostic tool has received, the baseline data of the various components in a vehicle, part images, parts information, and information from remote servers (internet, database information, etc.). Additionally, the display can show videos for the user to view and the accompanying audio can be heard via the built in speakers (not shown). The speakers can be a single speaker or multiple speakers for stereo sound. A microphone (not shown) may be included and allows the technician to record information such as the noise being made by the vehicle for later analysis or for comparison with stored data. Further, the technician can also record comments or notes during the testing for later retrieval and analysis.

In one embodiment, the display allows the user to input selection through the touch screen for interactive navigation and selection, wherein the technician can select a menu item, such as the diagnostic hub 400 (further discussed below) by touching the selection on the diagnostic hub/screen. Additionally, the touch screen, when tapped, can also be used to wake up the diagnostic tool if it's in a sleep mode.

The camera 114 may be positioned to face the user so that user may conduct a video chat with another person at a remote location. The camera may also be positioned on any surface of the diagnostic tool 100 including on the opposite side of display 104 so that images of parts of an engine or any components desired by the user can be taken.

Figure 2:
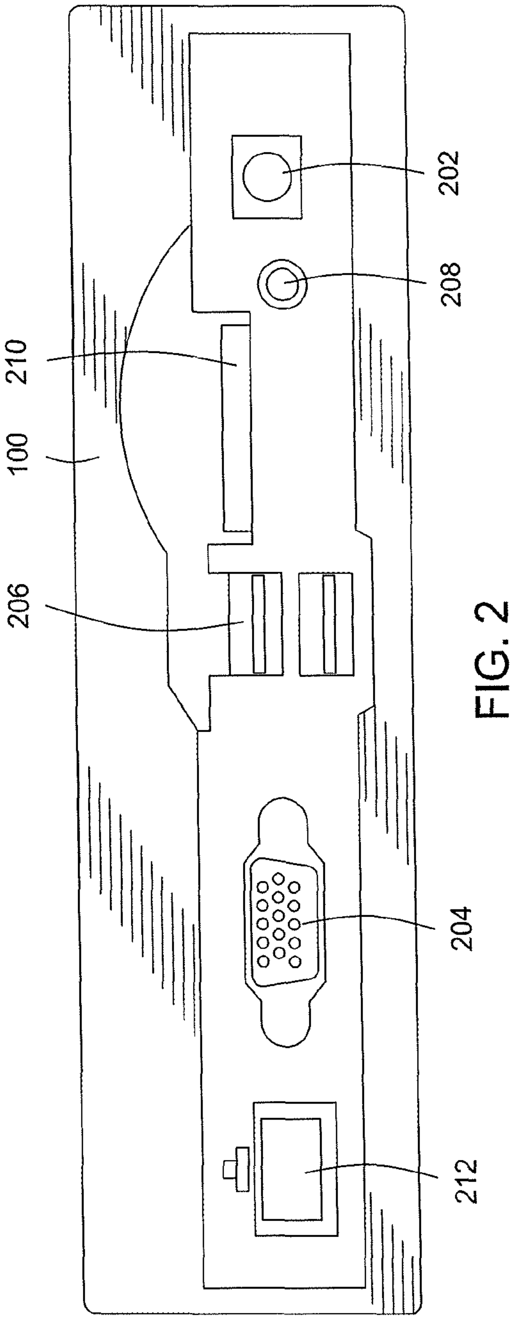
FIG. 2 is a top view of the diagnostic tool of FIG. 1 showing various connectors.

FIG. 2 is a top view of the diagnostic tool 100 of FIG. 1 showing various connectors. Turning to the connections available on the diagnostic tool 100, the diagnostic tool can be connected to an A/C power source via an A/C power connector 202. The A/C power source powers the diagnostic tool 100 and recharges the diagnostic tool's internal battery (not shown). A VGA video connector 204 may be included and allows the information on the diagnostic tool 100 to be displayed on an external display, such as a display on a personal computer. Other display connector types can include HDMI for better graphics and sound.

A series of host USB (universal serial bus) connectors 206 may be included to couple additional devices to the diagnostic tool 100. In one embodiment, there are two connectors, but more or less connectors are contemplated by the invention. Additional devices can add functionality to the diagnostic tool or allow the diagnostic tool 100 to add functionality to another device. The functionality can include communications, printing, memory storage, video, two-channel scope and other functionality.

A stereo headphone connection 208 may be included and allows the technician to add a headphone to the diagnostic tool 100. A card reader 210 may be provided to add components for increased functionality, such as a wireless modem, memory, TV tuner, networking, mouse, remote control, transmitters, receivers, Wi-Fi or Bluetooth adapters, modems, Ethernet adapters, barcode readers, IrDA adapters, FM radio tuners, RFID readers, and mass storage media, such as hard drives and flash drives and other functionalities to the diagnostic tool 100. An Ethernet connector 212 may be included and allows for network connection with the diagnostic tool 100 in order to transfer data to and from the diagnostic tool to a remote device such as a server or personal computer (not shown). The connections are not limited to what are shown in FIG. 2, but additional connectors are contemplated such as Firewire, HDMI, and serial connections.

Figure 3:
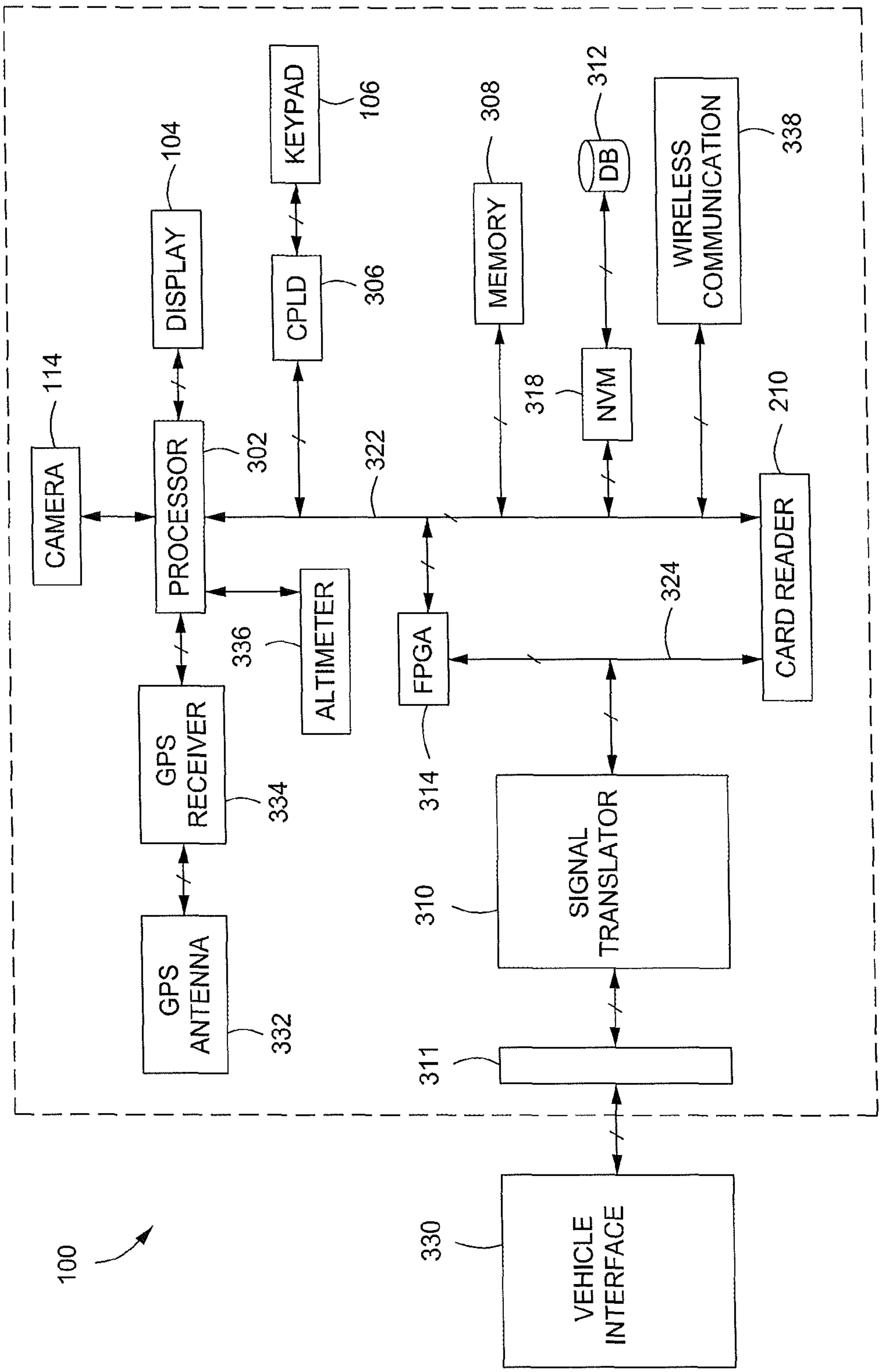
FIG. 3 is a block diagram of the components of the diagnostic tool of FIG. 1 according to an embodiment of the invention.

FIG. 3 is a block diagram of the components of the diagnostic tool 100 of FIG. 1 according to an embodiment of the invention. In FIG. 3, the diagnostic tool 100 according to an embodiment of the invention may include a camera 114, a processor 302, a field programmable gate array (FPGA) 314, a first system bus 324, the display 104, a complex programmable logic device (CPLD) 306, the input device 106 or function button, a memory 308, an internal non-volatile memory (NVM) 318 having a database 312 and software program, a card reader 210, a second system bus 322, a connector interface 311, a selectable signal translator 310, a GPS antenna 332, a GPS receiver 334, an optional altimeter 336 and a wireless communication circuit 338.

The wireless communication circuit 338 can be configured to communicate wirelessly with a vehicle communication interface that is coupled to the vehicle's data link connector (both now shown). The vehicle communication interface sends signals received from the various electronic control units (ECUs) in the vehicle. Wireless communication circuit 338 communicates with the processor 302 via the second system bus 322, The wireless communication circuit 338 can be configured to communicate via RF (radio frequency), satellites, cellular phones (analog or digital), Bluetooth®, Wi-Fi, Infrared, Zigby, Local Area Networks (LAN), WLAN (Wireless Local Area Network), other wireless communication configurations and standards or a combination thereof. The wireless communication circuit 338 allows the diagnostic tool to communicate with other devices wirelessly such as with a remote computing device (not shown) having remote databases. The wireless communication circuit 338 includes an antenna built therein (not shown) and being housed within the housing 102 or can be externally located on the housing 102.

Signal translator 310 conditions signals received from an ECU unit through the wireless communication circuit 338 to a conditioned signal compatible with diagnostic tool 100. Signal translator 310 can communicate with, for example, the following communication protocols: J1850 (VPM and PWM), ISO 9141-2 signal, communication collision detection (CCD) (e.g., Chrysler collision detection), data communication links (DCL), serial communication interface (SCI), Controller Area Network (CAN), Keyword 2000 (ISO 14230-4), OBD II or other communication protocols that are implemented in a vehicle.

The circuitry to translate and send in a particular communication protocol can be selected by FPGA 314 (e.g., by tri-stating unused transceivers). Signal translator 310 may be also coupled to FPGA 314 and the card reader 210 via the first system bus 324. FPGA 314 transmits to and receives signals (i.e., messages) from the ECU unit through signal translator 310 and the wireless communication circuit 338.

The FPGA 314 may be coupled to the processor 302 through various address, data and control lines by the second system bus 322. FPGA 314 is also coupled to the card reader 210 through the first system bus 324. The processor 302 may also be coupled to the display 104 in order to output the desired information to the user. The processor 302 communicates with the CPLD 306 through the second system bus 322. Additionally, the processor 302 may be programmed to receive input from the user through the input device 106 via the CPLD 306 or via the touchscreen display 104. The CPLD 306 may provide logic for decoding various inputs from the user of the diagnostic tool 100 and also provides glue-logic for various other interfacing tasks.

Memory 308 and internal non-volatile memory 318 may be coupled to the second system bus 322, which allows for communication with the processor 302 and FPGA 314. Memory 308 can include an application dependent amount of dynamic random access memory (DRAM), a hard drive, and/or read only memory (ROM). Software to run the diagnostic tool 100 can be stored in the memory 308 or 318, including any other database. The database 312 can include diagnostic information and other information related to vehicles.

Internal non-volatile memory 318 can be an electrically erasable programmable read-only memory (EEPROM), flash ROM, or other similar memory. Internal non-volatile memory 318 can provide, for example, storage for boot code, self-diagnostics, various drivers and space for FPGA images, if desired. If less than all of the modules are implemented in FPGA 314, memory 318 can contain downloadable images so that FPGA 314 can be reconfigured for a different group of communication protocols.

A GPS antenna 332 and GPS receiver 334 can be included and may be mounted in or on the housing 102 or any combination thereof. The GPS antenna 332 electronically couples to the GPS receiver 334 and allows the GPS receiver to communicate (detects and decodes signals) with various satellites that orbit the Earth. In one embodiment, the GPS antenna 332 and GPS receiver 334 are one device instead of two. The GPS receiver 334 and GPS antenna 332 may electronically couple to the processor 302, which may be coupled to memory 308, 318 or a memory card in the card reader 210. The memories can be used to store cartographic data, such as electronic maps. The diagnostic tool can include all the maps for the U.S. (or country of use), North America or can have the region or state where the diagnostic tool is located. In alternative embodiments, the diagnostic tool can have all the maps of the world or any portion of the world desired by the user. This allows the diagnostic tool to be a GPS device so that a driver can drive from one location to another. The maps may be over lay or may incorporate traffic, local events, and location of other GPS devices (smart phones) and other information that can be useful to the technician. By being able to locate other diagnostic tools with GPS, then the technicians may be able to use the diagnostic tools to locate each other in order to conduct a meeting or have a social event.

The GPS receiver communicates with and "locks on" to a certain number of satellites in order to have a "fix" on its global location. Once the location is fixed, the GPS receiver, with the help of the processor, can determine the exact location including longitude, latitude, altitude, velocity of movement and other navigational data of the diagnostic tool 100.

Should the GPS receiver be unable to lock onto the minimum number of satellites to determine the altitude or unable to determine the altitude for any reason, the altimeter 336 can be used to determine the altitude of the diagnostic tool 100. The altimeter 336 is electronically coupled to the processor 302 and can provide the altitude or elevation of the diagnostic tool 100. The altimeter 336 can be coupled to a barometric pressure sensor (not shown) in order to calibrate the elevation measurements determined by the altimeter. The sensor can be positioned interior or exterior to the housing 102 of the diagnostic tool 100. Minor atmospheric pressure changes can affect the accuracy of the altimeter, thus, diagnostic tool can correct for these changes by using the sensor in conjunction with the altimeter along with a correction factor known in the art.

In an alternative embodiment, a vehicle communication interface 330 of the vehicle under test is in communication with the diagnostic tool 100 through connector interface 311 via an external cable (not shown). Selectable signal translator communicates with the vehicle communication interface 330 through the connector interface 311.

Figure 4:
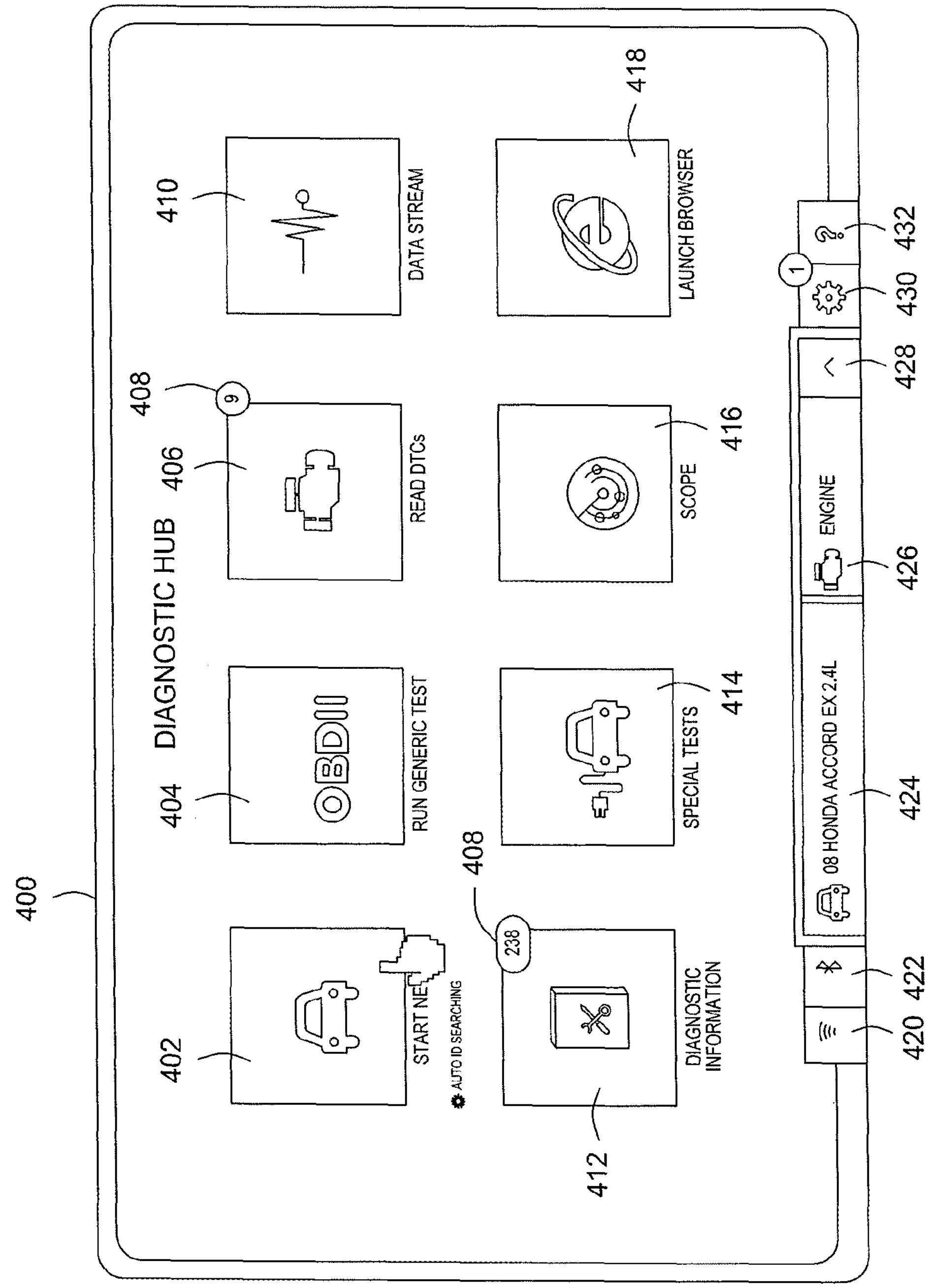
FIG. 4 illustrates the diagnostic hub according to an embodiment of the invention.

FIG. 4 illustrates the diagnostic hub 400 according to an embodiment of the invention. The diagnostic hub 400 can be a GUI displayed on display 104 and includes various components. The diagnostic hub components may be selected by using a finger to select the component. Alternatively, the component may be selected through the use of stylus or other similar means.

The components of the diagnostic hub 400 may include a start new button 402, an OBD generic test button 404, a read DTC button 406, a data stream button 410, a diagnostic information button 412, a special tests button 414, a scope button 416, a web browser button 418 and others. Once selected by pressing or actuating the respective button, the diagnostic tool will begin the functionality assigned to that button and as explained below. The various buttons may include information indicator 408 that indicates that additional information is available related to the functionality associated with that button. The information indicator 408 may also indicate the number of additional information that is available and can update the number dynamically and automatically. The information indicator 408 may blink or flash or change colors to indicate that additional information is available. The information indicator's number can increase or decrease as additional information becomes available while the user uses the diagnostic tool 100.

At the lower portion of the diagnostic hub there are other indicators regarding the status of a connection such as Wi-Fi indicator 420 and Bluetooth indicator 422. These indicators indicate whether there is Wi-Fi connection or a Bluetooth connection or both. Window 424 provides information about the vehicle under test. The vehicle under test information may be provided through the vehicle communication interface, entered by the user through the start new button 402 or through automatic detection via the vehicle communication interface. Window 426 may indicate particular information about the vehicle, such as engine type. The type of information shown in window 426 may be changed by selector dial 428, which when accessed provides additional information to be selected via a menu. Settings 430 may be selected to access various menus for personalizing the diagnostic tool such as brightness, sensitivity of the display, etc. A help button 432 may be provided to allow user to access help information, such as help topics for the diagnostic tool.

Figure 5:
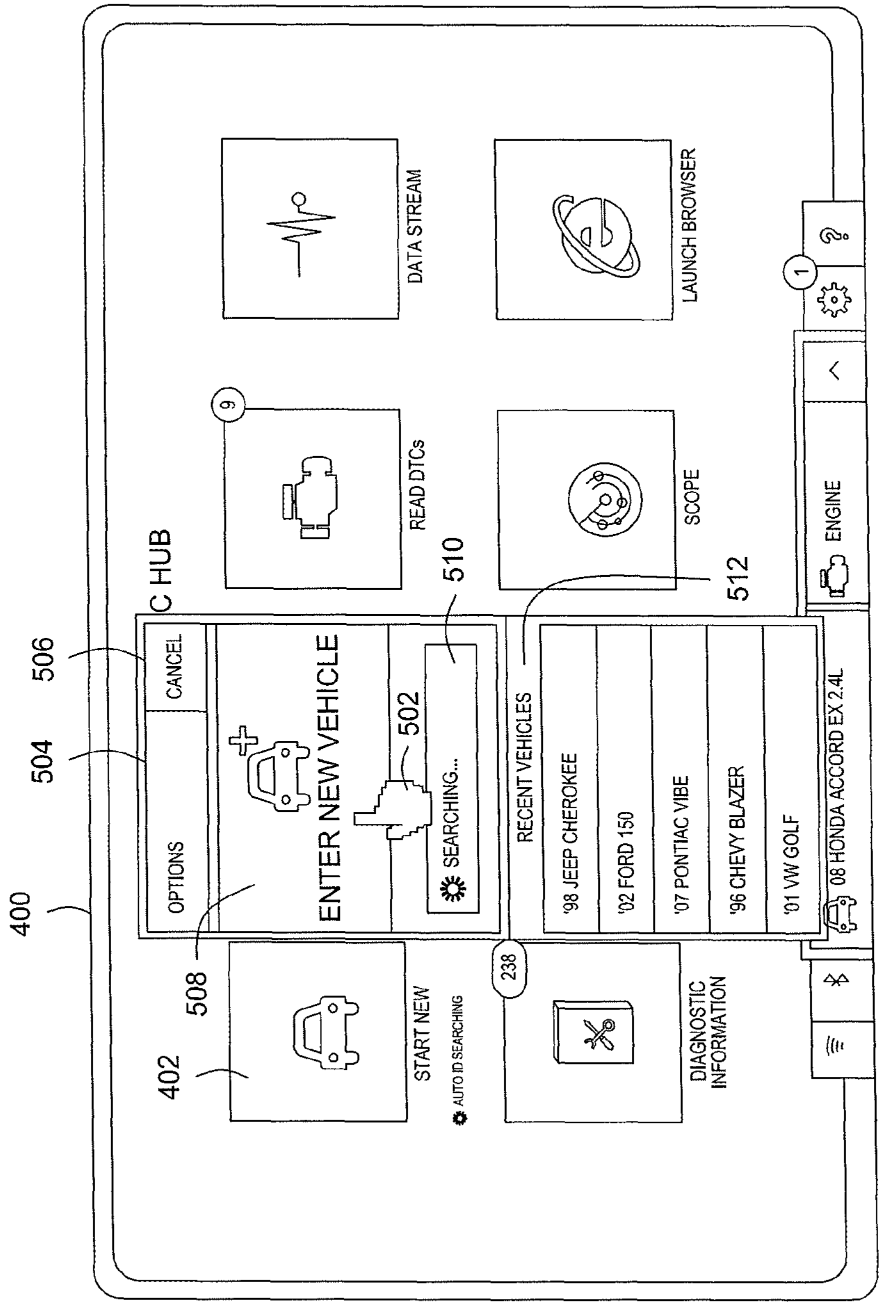
FIG. 5 illustrates the user selecting start new button according to an embodiment of the invention.

FIG. 5 illustrates the user selecting start new button 402 according to an embodiment of the invention. The user may use his finger or a stylus to press the start new button 402 or can move a virtual hand 502 in order to depress start new button 402. Once the start new button 402 is selected, then a window 504 opens for additional selection by the user. Window 504 includes a cancel button 506, and recent vehicles list 512. The recent vehicles list 512 illustrates vehicles recently worked on by the diagnostic tool 100. The cancel button 506 if depressed will return display screen to diagnostic hub 400. Additionally, the diagnostic hub can automatically search 510 for the vehicle under test based on its various connections. If this automatic search 510 does not identify the vehicle under test, the user may select enter new vehicle button 508, and select the vehicle by make, model, and year or alternatively entering the vehicle identification number.

Figure 6:
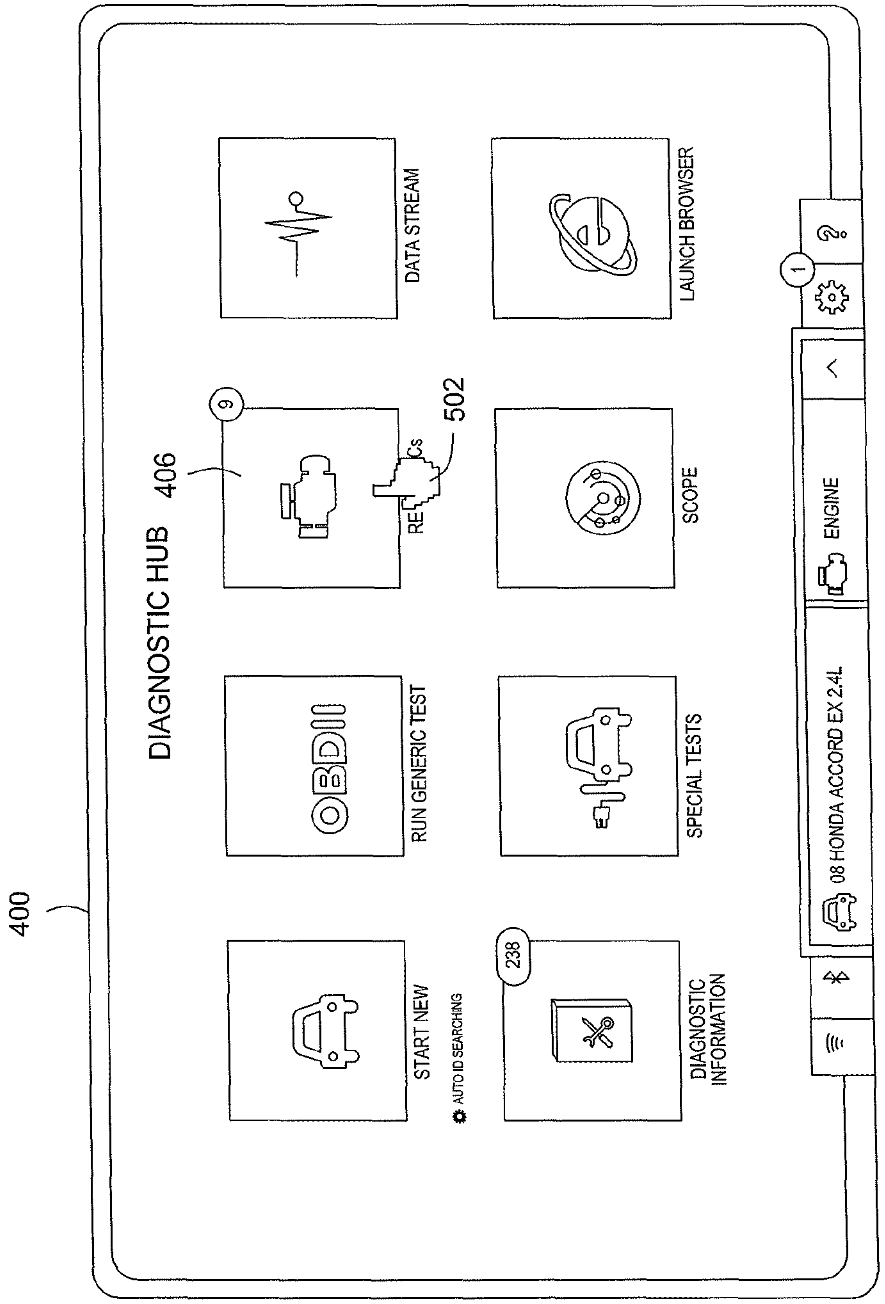
FIG. 6 illustrates a user selecting read DTC button according to embodiment of the invention.

FIG. 6 illustrates a user selecting read DTC button 406 according to embodiment of the invention. The user can use his finger to select read DTC button 406 or can move a virtual hand 502 in order to select the read DTC button 406. Once the read DTC button 406 is selected, FIG. 7 illustrates a sample screen of retrieved DTC according to embodiment of the invention.

Figure 7:
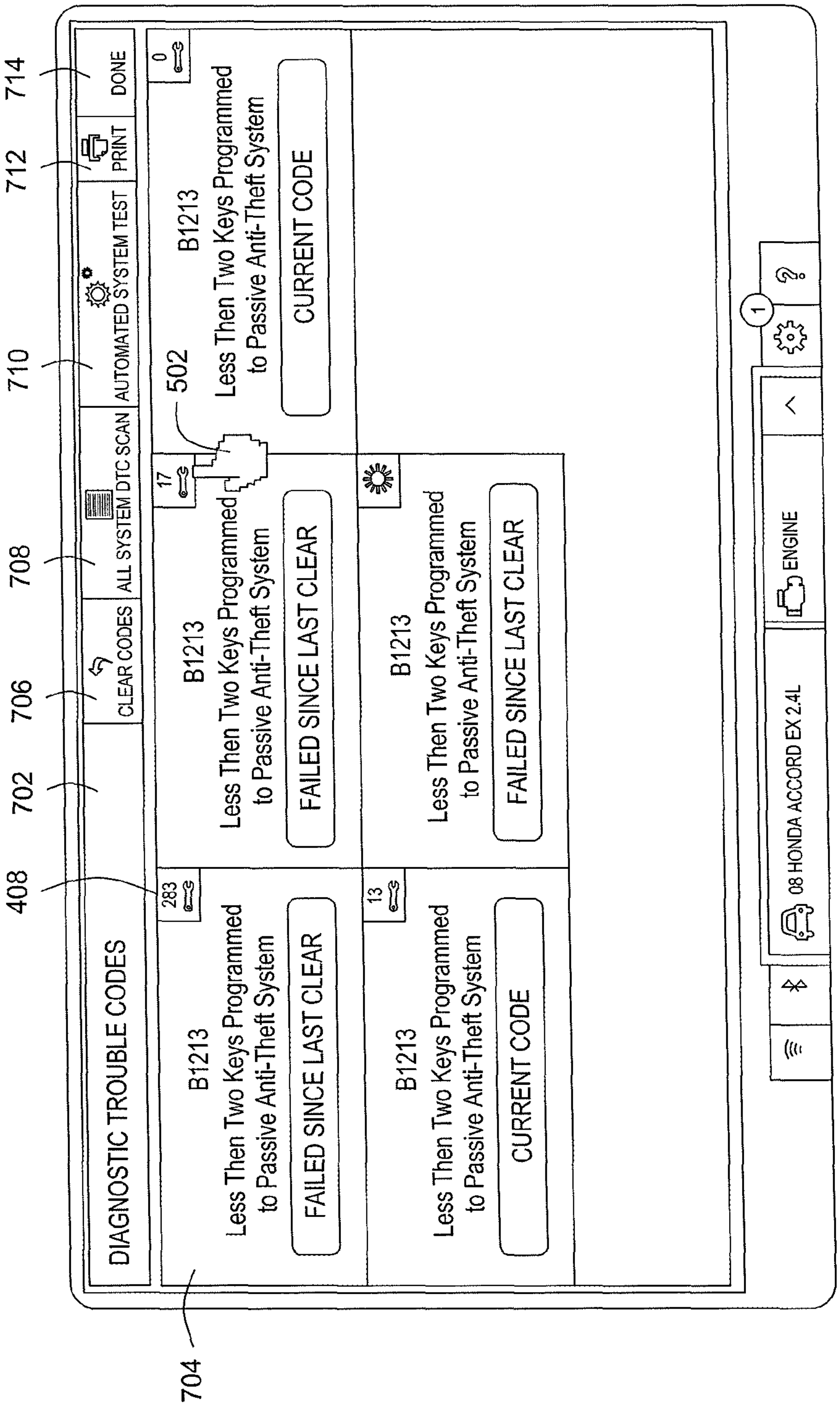
FIG. 7 illustrates a sample screen of retrieved DTC according to embodiment of the invention.

As shown in FIG. 7, various retrieved DTCs are displayed along with information indicators 408. Window 702 shows the user that diagnostic tool 100 is displaying diagnostic trouble codes. Window 704 shows the DTC number along with the definition associated with the DTC number. Information indicator 408 shown on a corner of the window 704 indicates the number of additional information that is available for a particular DTC. The additional information may include top fixes, wiring diagrams, components, bulletins, cost of repair, cost and availability of components, tools needed, time for repair, level of skill needed, and other information. Window 704 also shows information about the DTC such as failed since last clear or is a current code.

FIG. 7 also illustrates additional selectable buttons such as clear codes 706, all system DTC scan 708, automated system test 710, print 712, and done 714. The user can use his finger or a stylus to select the various buttons or can move a virtual hand 502 in order to select the various buttons. If clear codes button 706 is selected, then the DTCs are cleared from the various ECUs of the vehicle by the diagnostic tool. If all system DTC scan button 708 is selected, then the DTCs from the various ECUs are retrieved and displayed as shown in FIG. 7. If the automated system test button 710 is selected, then the diagnostic tool 100 runs automatically a series of predetermined system test for the user. If the print button 712 is selected, then the screen shown in FIG. 7 can be printed to a remote printer. If the done button 714 selected, then the diagnostic tool will return to the screen shown in FIG. 4.

Figure 8:
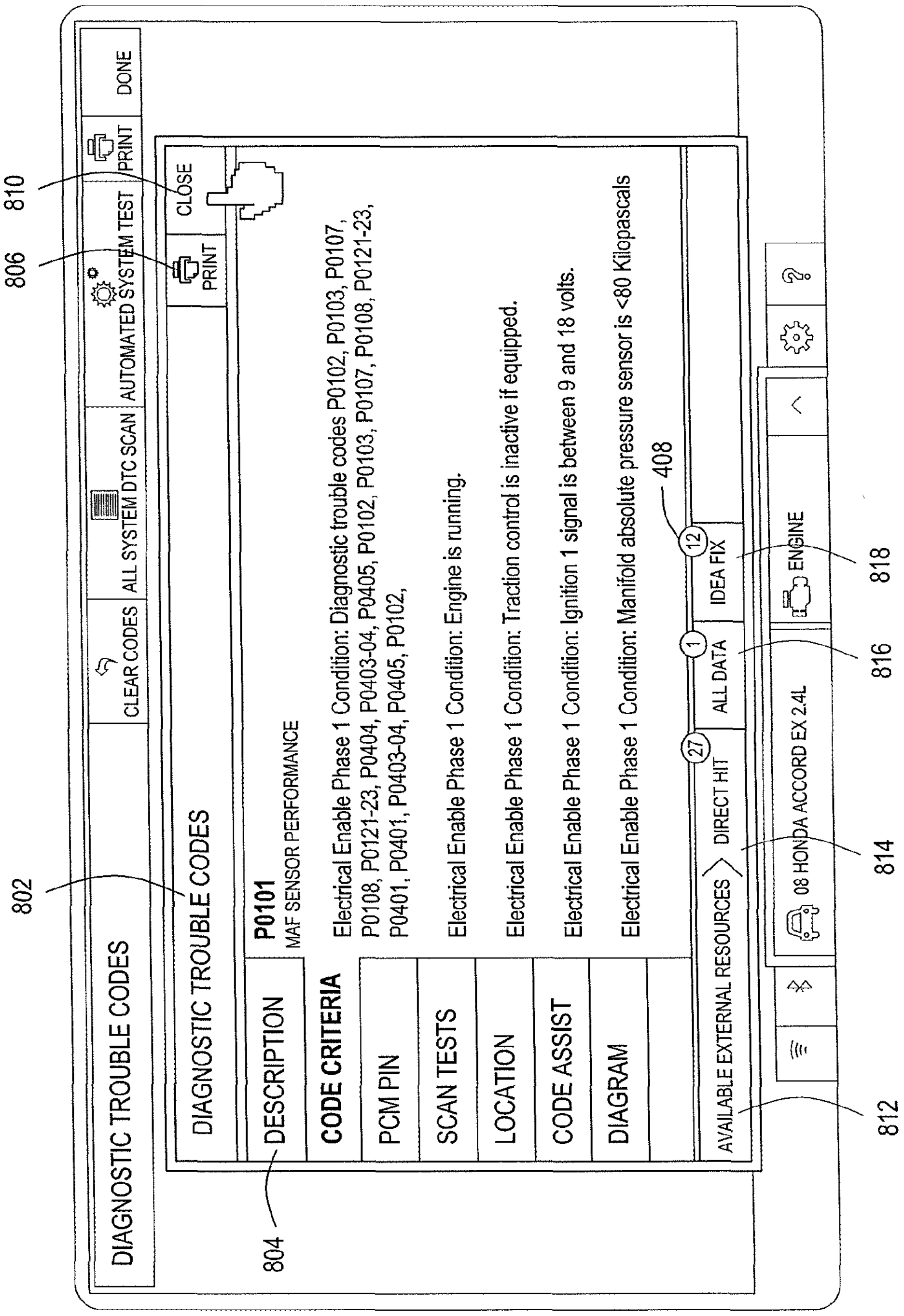
FIG. 8 illustrates additional information about the selected DTC according to an embodiment of the invention.

The user can use his finger, a stylus, or can move a virtual hand 502 in order to select a DTC shown in window 704 for additional information about the DTC as shown in FIG. 8.

FIG. 8 illustrates additional information 804 about the selected DTC according to an embodiment of the invention. The screen shown in FIG. 8 can be made to appear floating above the screen shown in FIG. 7 or is a new window. A window 802 indicates to the user that he is viewing diagnostic information. The additional information 804 can include a description of the DTC, the code criteria (as shown), PCM pin, scan tests, location, code assist, and diagram. These additional information 804 are mainly stored on the diagnostic tool 100 but could alternatively be retrieved from a remote database.

At the bottom of FIG. 8, window 812 illustrates that available external resources for the selected DTC include direct hit 814 (database of top fixes), all data 816 (database of original equipment data) and idea fix 818 (suggested fix database). These are but examples of additional external resources that are available to user including information indicator 408 that indicates the number of additional information that is available. The user may select the print button 806 to print the information shown on the screen. Once the user is done he can select close button 810 to return to the screen shown in FIG. 7 and then to select the done button 714 in order to return to the diagnostic hub.

Figure 9:
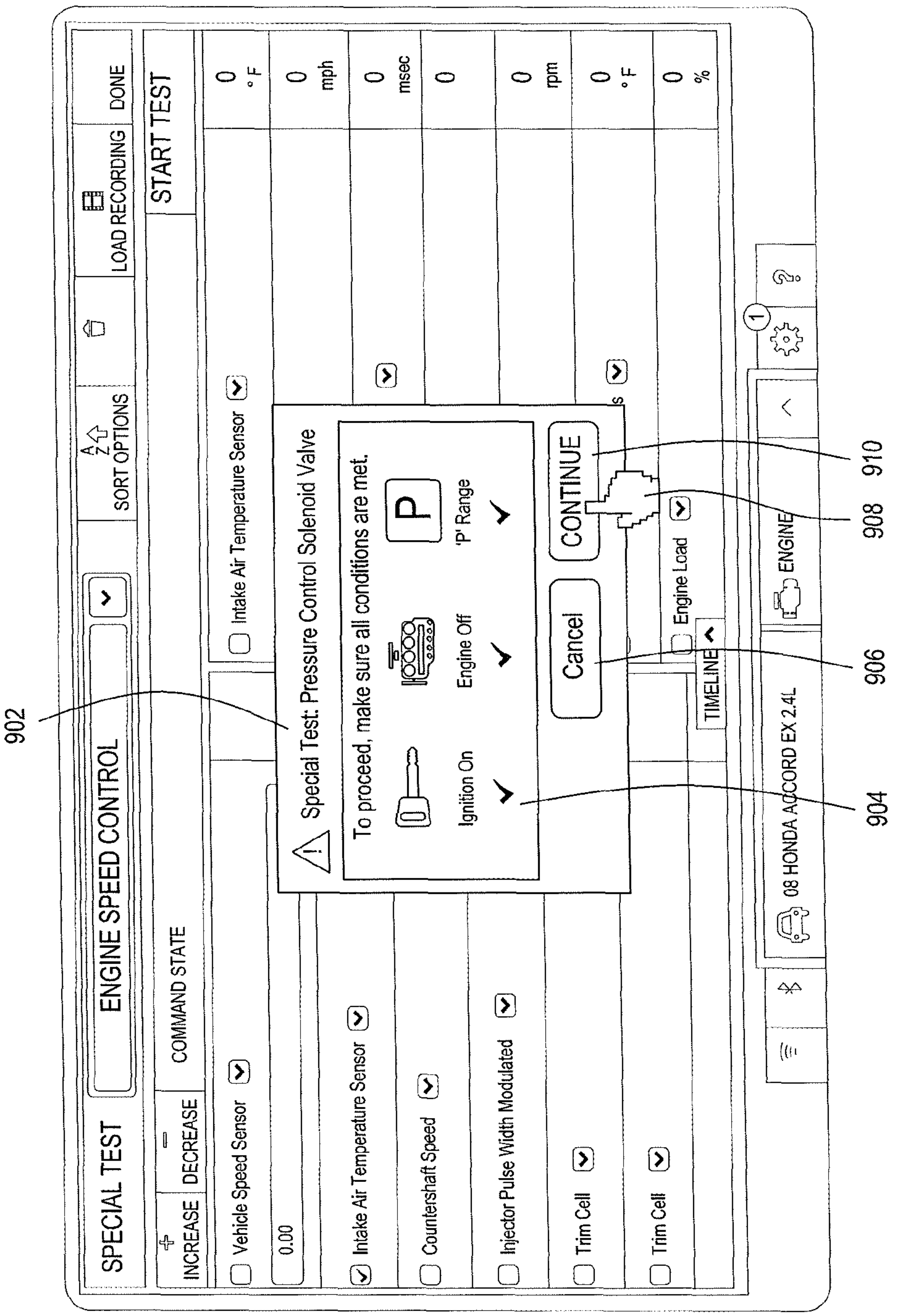
FIG. 9 illustrates a window that may appear when the special tests button is selected according to embodiment of the invention.

FIG. 9 illustrates a window 902 that may appear when the special tests button 414 is selected according to embodiment of the invention. The window 902 indicates the special test requested by the user relates to pressure control solenoid valve. Additionally to proceed certain parameters 904 must exist, such as ignition key on, engine off, and “P” range. At this point, the user can cancel using cancel button 906 or select continue button 910 with virtual hand 908 (after parameters exist as required) to proceed to the window shown in FIG. 10.

In another embodiment, the certain parameters may be updated dynamically as the user sets the conditions. For example, the diagnostic tool can detect when the engine has been turned off and can automatically update the parameters in window 902 accordingly.

Figure 10:
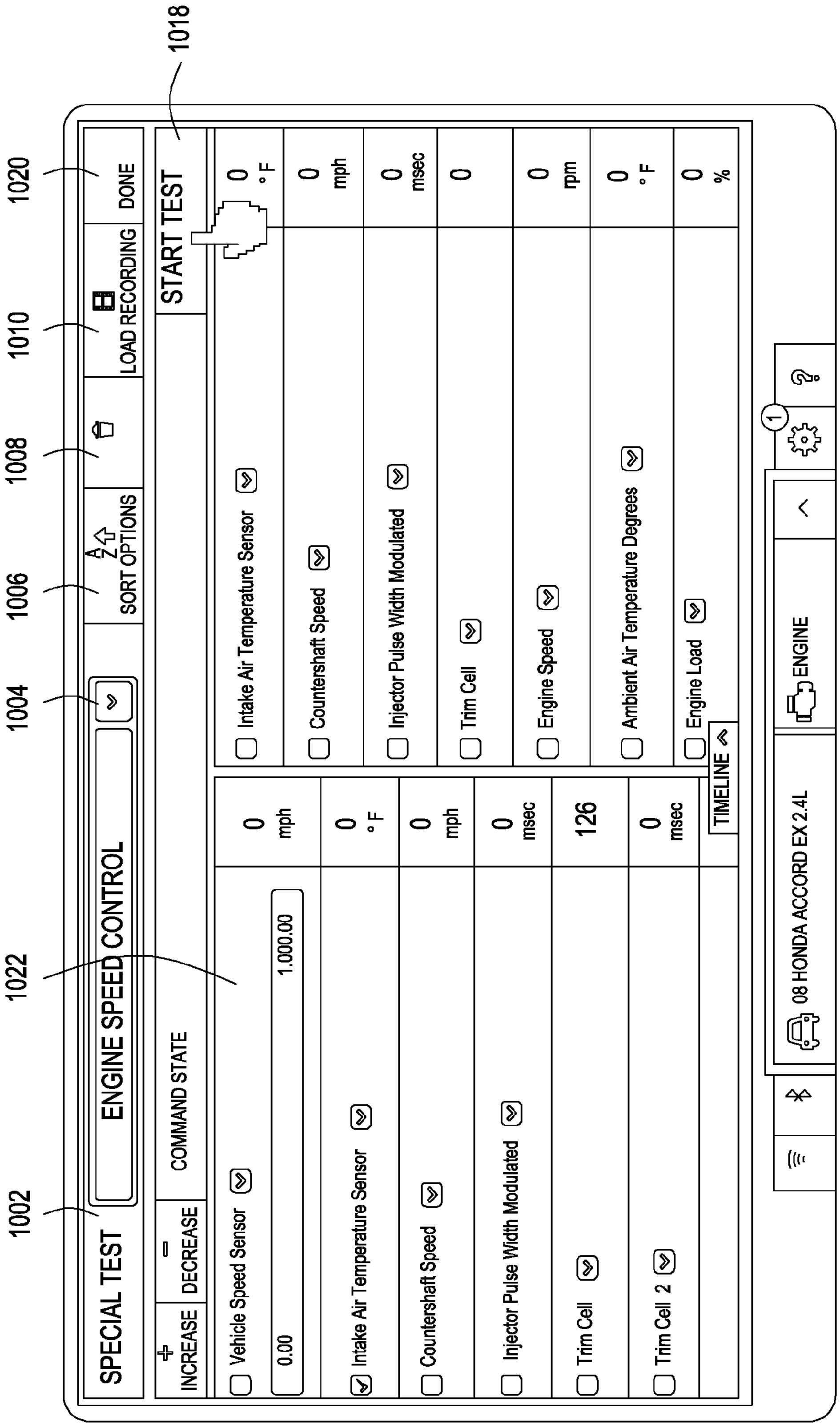
FIG. 10 illustrates a screen having various data parameters that can be measured during a special test according to an embodiment of the invention.

FIG. 10 illustrates a screen having various data parameters that can be measured during a special test according to an embodiment of the invention. Window 1002 indicates that the diagnostic tool 100 is conducting a special test, namely an engine speed control. Using dial button 1004, the user can change the type of special test to be conducted by the diagnostic tool 100. The various data parameters that is measured can be sorted by selecting sort options button 1006 to sort by descending or ascending order or the like. Clear data button 1008 maybe selected to clear all data collected during the special test. Load recording button 1010 can be selected to load previous data recordings or current data recordings stored in the diagnostic tool 100 or remotely.

The various data parameters that can be recorded during a special test include vehicle speed sensor, intake air temperature sensor, countershaft speed, injector pulse width modulated, trim cell, engine speed, ambient air temperature degrees, engine load, and the like. The data parameters may be measured in mph, Fahrenheit, Celsius, milliseconds, percentage, voltage, current, pressure and the like. The user can select start test button 1018 to start the special test and when done, select the done button 1020.

Figure 11:
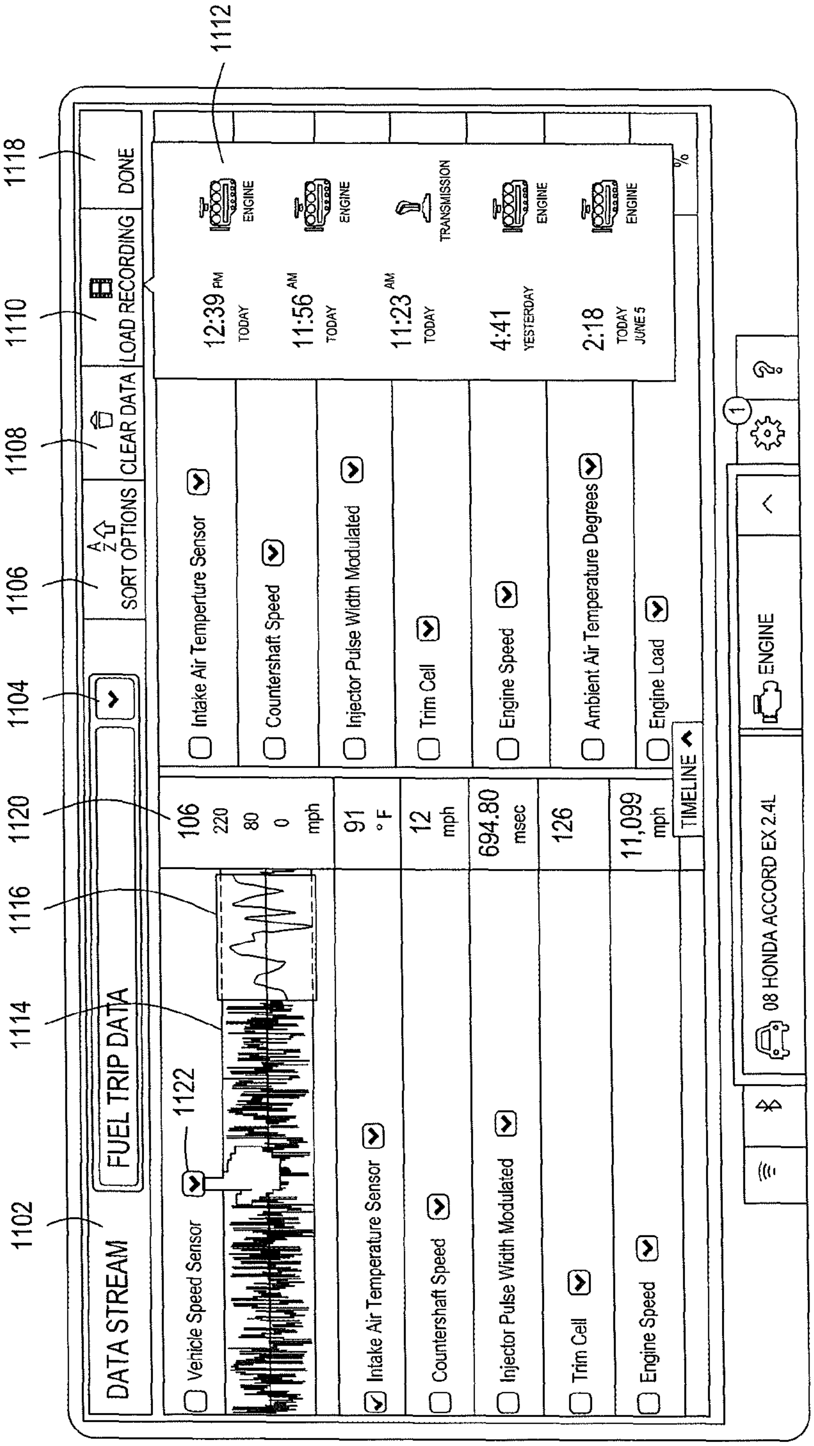
FIG. 11 illustrates a data stream window according to an embodiment of the invention.

FIG. 11 illustrates a data stream window 1102 according to an embodiment of the invention. Dial button 1104 may be selected to further refine the type of data stream the user would like to view on diagnostic tool 100. In this embodiment, data related to vehicle speed sensor, intake air temperature sensor, countershaft speed, injector pulse width modulated, trim cell, engine speed, intake manifold pressure, and the like may be shown to the user. A data window 1114 displays a current data reading, for example, of the vehicle speed sensor and a zoom window 1116 displays a zoomed portion of the data window 1114 for easy viewing of the data window. The zoom window 1116 is generated and controlled by the processor. Data in data window 1114 may be viewed in various formats by selecting dial button 1122 by the user. Once selected, user can view data in bar graph form, waveform and the like. Additionally, the user can select to move the data window 1114 up to the top or to the bottom or to the middle or to various locations on the screen. The user can also select to only view that particular data window or to view that particular data window 1114 on a full screen. Further, if additional information is needed about the component, the user can select to receive more information about the component such as cost, replacement time, level of skill needed, availability and the like.

The actual numerical reading 1120 of the data is also displayed, The numerical reading may also change in color or flash to indicate the data be collected is beyond predetermined thresholds.

The zoom window 1116 enlarges a portion of the data stream in the data window 1114 and may be movable along the data window 1114 as needed by the user. The zoom window 1116 may also alert the user via, for example, flashing or changing color in order to alert the user that the data in the data stream shown in the zoom window has gone beyond predetermined thresholds. In another embodiment, the user may be alerted via vibration of the diagnostic tool or noise, such as a beep from the speaker. That is, the user is alerted because the data in the data stream is above or below predetermined thresholds for that particular component or parameter being tested.

Examples of predetermined thresholds include whether a DTC has been set, temperature of the component is too high or too low, rotations per minute of the engine is too high or too low, and the like.

In another embodiment, as the zoom window 1116 is moved along the data window 1114 by the user, if the portion of the data stream in the zoom window is beyond the predetermined thresholds, then the user is alerted so that he can further review the data. This allows the user to quickly determine where the data that he is interested in may be located. In still another embodiment, the zoom window 1116 may "pop up" when the data in the data stream is beyond the predetermined thresholds and thereby alerting the user to view the data window closely.

Using sort options button 1106, the user can sort the various parameters being collected to his preferences. Once the test is completed, user can clear data by selecting clear data button 1108. The user may also view previous data recordings 1112 by selecting load recording button 1110, which can also show the previous data recordings available to user for selection. In one embodiment, the previous data recordings 1112 may alert the user via, for example, flashing or changing color that a particular previous data recording contains data that is beyond the predetermined thresholds. This allows the user to more efficiently view the previous data recording that would be of interest to the user. Once the previous data recording is selected, the user may view the data stream associated with that particular previous data recording.

As the data in the data stream is be recorded and the diagnostic tool is able to determine that the data is beyond the predetermined thresholds, the diagnostic tool continues to determine that additional information may be available and updates the number shown on the information indicator 408 as appropriate. The update to the number shown on information indicator 408 can be done in the background and automatically. The user may select done button 1118 in order to return to the diagnostic hub.

Figure 12:
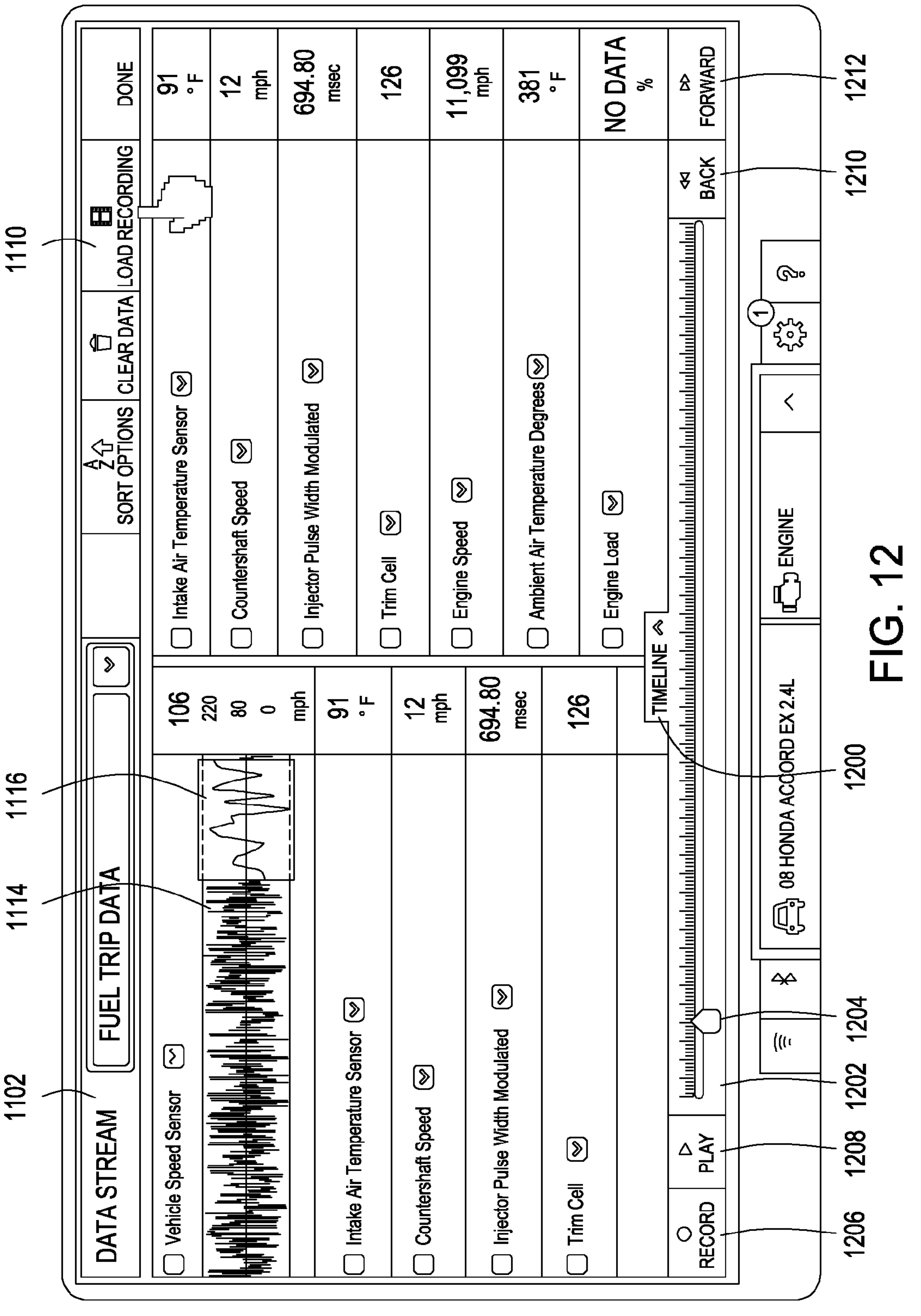
FIG. 12 illustrates a data stream window having a timeline 1200 according to an embodiment of the invention.

FIG. 12 illustrates a data stream window 1102 having a timeline 1200 according to an embodiment of the invention. Timeline 1200 allows the user to view the data stream at various points in time as desired. A frame window 1202 is provided with increments thereon to provide reference points on the timeline. Increments may be in seconds, milliseconds, 2 seconds, 4 seconds, 5 seconds, 8 seconds, 10 seconds and the like. A frame indicator 1204 is provided to indicate to the user which portion of time along the timeline is being displayed. The frame indicator, in one embodiment, can indicate when it reaches data that is beyond predetermined parameters in order to alert the user to view the data stream closely. The frame indicator can indicate by flashing, changing colors, glowing or the like. Record button 1206 is provided to allow user to record the data stream as desired.

In one embodiment, the data stream may be recorded automatically once the data stream button 410 is first selected or automatically recorded at any time desired by the user. The data stream may recorded in a buffer for a certain time increments such as 3 seconds, 10 seconds, 30 seconds, 45 seconds, 1 minute, 5 minutes, 10 minutes, 15 minutes, 20 minutes and the like. The buffer is continuous and records for the set amount as the diagnostic tool 100 is used. By having the data stream recorded in a buffer, the user may use the timeline to view any data that has gone beyond the predetermined parameters. The buffer may be stored in any of the memory described herein such as memories 308 and 318.

Once the data stream is recorded, the user can select the play button 1208 to start the display of the data stream and the frame indicator will move along the timeline accordingly. Alternatively, the user may select load recording button 1110 and load the desired previous data recordings 1112. In another embodiment, the user may manually move the frame indicator 1204 to any point along the timeline or time frame and then press the play button 1208. A back button 1210 moves the frame indicator back in time (in one direction) for a predetermined increment period of time and a forward button 1212 moves the frame indicator forward in time (in a second direction) for a predetermined increment period of time. A pause (not shown) button may also be used to provide a stationary view of the data window.

In another embodiment, the zoom window 1116 may also be moved manually by the user with his finger or a stylus, which will also move the frame indicator correspondingly along the time line. In still another embodiment, there may be more than one zoom window and can function as described herein.

The embodiments described herein are implemented on a graphical user interface that can be stored on a computer readable medium. The computer readable medium includes the memories described herein, CD, DVD, flash memory and the like. The computer readable medium can be external or internal to the diagnostic tool and executed by the processor.

Although the embodiments herein are described the use with a diagnostic tool, they may also be used in any computing device such as a tablet, a PC, notebook, PDA, smart phone and the like. The diagnostic tool and the graphical user interface can be used to diagnose vehicles, appliances, medical devices and the like.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A vehicle diagnostic tool having a plurality of diagnostic functionality, the vehicle diagnostic tool comprising:

a processor that processes the plurality of diagnostic functionality of the vehicle diagnostic tool;

a touchscreen display that displays information; and a memory including a computer program that when executed by the processor provides a graphical user interface (GUI) on the touchscreen display, the GUI comprises:

a data stream window that displays diagnostic data received from a vehicle, the data stream window being repositionable within the GUI via a user using the touchscreen display;

a zoom window that displays a zoomed part of the data stream window, wherein the zoom window pops up when the diagnostic data in the zoom window is beyond a first predetermined threshold;

a load recording button, when actuated, causes a display of previously recorded data streams to the user, wherein the user is alerted if a previously recorded data stream includes data that is beyond a second predetermined threshold;

a time line having increments of time; and a frame indicator that is positioned separate from the data stream window and translates along the time line to indicate the increments of time being viewed on the data stream window, wherein the frame indicator is capable of being moved along the time line by the user via the touchscreen display.

2. The vehicle diagnostic tool of claim 1, further comprising:

a plurality of GUI buttons that causes the frame indicator to move along the time line in a first direction in time, a second direction in time or remains stationary in time.

3. The vehicle diagnostic tool of claim 1, wherein the frame indicator indicates to the user that the diagnostic data in the data stream window is beyond predetermined parameters.

4. The vehicle diagnostic tool of claim 1, wherein the zoom window is movable along the data stream window by the user using the touch screen display.

5. The vehicle diagnostic tool of claim 4, wherein the frame indicator is also moved correspondingly when the zoom window is moved.

6. The vehicle diagnostic tool of claim 1 further comprising a record button and a play button.

7. The vehicle diagnostic tool of claim 1, wherein the data stream window is configurable to show diagnostic data in bar graph form or waveform form.

8. A non-transitory computer-readable medium storing processor executable instructions that include a graphical user interface on a computing device having a plurality of diagnostic functionality, the graphical user interface (GUI) comprising:

a data stream window that displays diagnostic data received from a vehicle, the data stream window being repositionable within the GUI via a user using the touchscreen display;

a zoom window that displays a zoomed portion of the data stream window, wherein the zoom window pops up when the diagnostic data in the zoom window is beyond a first predetermined threshold;

a time line having increments of time;

a load recording button, when actuated, causes a display of previously recorded data streams to the user, wherein the user is alerted if a previously recorded data stream includes data that is beyond a second predetermined threshold; and a frame indicator that is positioned separate from the data stream window and translates along the time line to indicate the increments of time being viewed on the data stream window, wherein the frame indicator is capable of being moved along the time line by the user using a touchscreen display, the movement of the frame indicator correspondingly moves the zoom window.

9. The non-transitory computer-readable medium of claim 8, further comprising:

a plurality of GUI buttons that causes the frame indicator to move along the time line in a first direction in time, a second direction in time or remains stationary in time.

10. The non-transitory computer-readable medium of claim 8, wherein the frame indicator indicates to the user that the diagnostic data in the data stream window is beyond predetermined parameters.

11. The non-transitory computer-readable medium of claim 8, wherein the zoom window is movable along the data stream window by the user using the touch screen display.

12. The non-transitory computer-readable medium of claim 11, wherein the frame indicator is also moved correspondingly when the zoom window is moved.

13. The non-transitory computer-readable medium of claim 8 further comprising a record button and a play button.

14. The non-transitory computer-readable medium of claim 8, wherein the data stream window is configurable to show diagnostic data in bar graph form or waveform form.

15. A computer program product comprising a non-transitory computer readable medium encoded with program instructions that, when executed by a processor in a vehicle diagnostic tool having a touch screen display, cause the processor to execute a method comprising:

displaying on the touch screen display a recorded data stream window that contains vehicle diagnostic data, the data stream window corresponds to a time line of a recording time of the data stream window and repositionable within the touch screen display by a user;

zooming in a portion of the data stream window with a zoom window controlled by a processor of the vehicle diagnostic tool;

alerting a user by popping up the zoom window when the vehicle diagnostic data in the zoom window is beyond a first predetermined threshold;

receiving a selection, from a list, a previously recorded data stream window;

alerting the user when the previously recorded data stream includes data that is beyond a second predetermined threshold; and controlling the display of the data stream window corresponding to the time line by moving a frame indicator that is positioned separately from the data stream window and that translates along the time line, the movement of the frame indicator correspondingly moves the zoom window.

16. The computer program product of claim 15 further comprising the step of:

alerting the user with the frame indicator that the zoom window contains diagnostic data that is beyond predetermined thresholds.

17. The computer program product of claim 15 further comprising the step of:

automatically recording the data stream window in a buffer that is stored in a memory of the vehicle diagnostic tool.

18. The computer program product of claim 15 further comprising the step of:

controlling the display of the data stream window by moving the zoom window which correspondingly moves the frame indicator that translates along the time line.

* * * * *